(12) United States Patent
Egawa et al.

(10) Patent No.: US 6,345,227 B1
(45) Date of Patent: Feb. 5, 2002

(54) VEHICULAR VELOCITY CONTROLLING APPARATUS AND METHOD TO FOLLOW UP A PRECEDING VEHICLE RUNNING AHEAD OF VEHICLE

(75) Inventors: Kenichi Egawa, Tokyo; Satoshi Tange, Kanagawa; Tetsuya Asada, Kanagawa; Akira Higashimata, Kanagawa, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 45 days.

(21) Appl. No.: 09/592,568

(22) Filed: Jun. 12, 2000

(30) Foreign Application Priority Data

Jun. 15, 1999 (JP) ........................................... 11-168265

(51) Int. Cl.⁷ ................................................ G08G 1/16
(52) U.S. Cl. ............................. 701/96; 701/93; 701/78; 180/170
(58) Field of Search .............................. 701/96, 93, 78, 701/79, 70, 36, 83, 91; 180/168, 169, 170

(56) References Cited

U.S. PATENT DOCUMENTS

| 5,959,572 A | 9/1999 | Higashimata et al. ......... 342/70 |
| 6,154,168 A | * 11/2000 | Egawa et al. ................. 342/71 |
| 6,161,073 A | * 12/2000 | Tange et al. .................. 701/96 |
| 6,285,944 B1 | * 9/2001 | Tange et al. .................. 701/96 |

FOREIGN PATENT DOCUMENTS

| EP | 0 484 995 | 5/1992 | |
| EP | 16061495 A1 | * 12/2000 | ............ G08G/1/16 |
| JP | 10-272963 | 10/1998 | |

* cited by examiner

*Primary Examiner*—William A. Cuchlinski, Jr.
*Assistant Examiner*—Olga Hernandez
(74) *Attorney, Agent, or Firm*—Foley & Lardner

(57) ABSTRACT

In vehicular velocity controlling method and apparatus for an automotive vehicle, an inter-vehicle distance from the vehicle to a preceding vehicle which is running ahead of the vehicle is detected, a target vehicular velocity is calculated to make a detected value of the inter-vehicle distance substantially equal to a target inter-vehicle distance, a vehicular velocity of the vehicle is detected, the vehicular velocity of the vehicle is adjustably controlled to make a detected value of the vehicular velocity substantially equal to the target vehicular velocity, a target braking pressure for a vehicular brake system is calculated in accordance with a target deceleration variable calculated on the basis of the target vehicular velocity and the detected value of the vehicular velocity; and a limitation on a rate of increase in the target braking pressure is placed when the target braking pressure is in excess of a predetermined braking pressure threshold value.

12 Claims, 8 Drawing Sheets

FIG.5
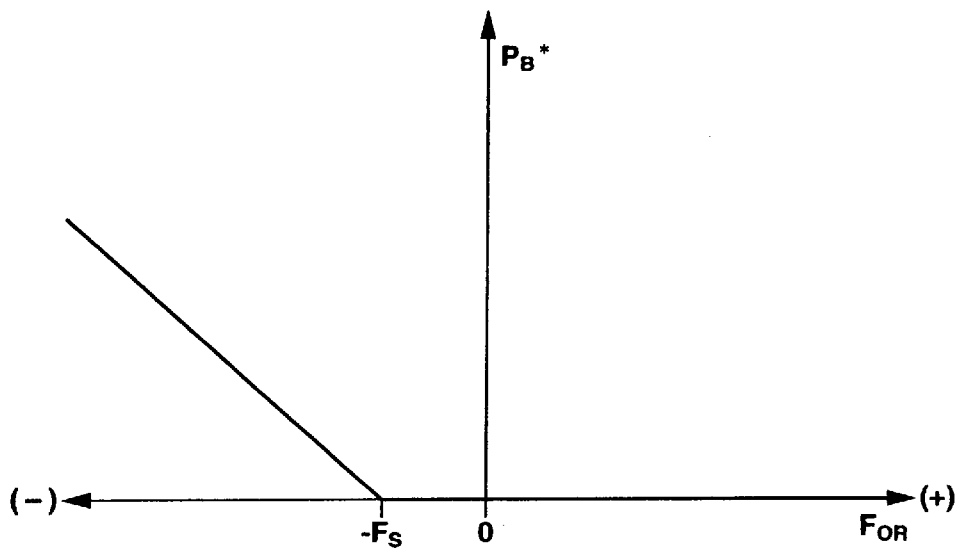
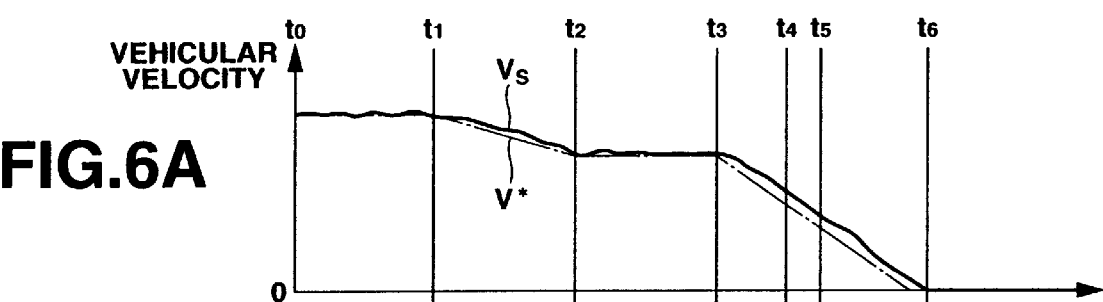
FIG.6A
FIG.6B
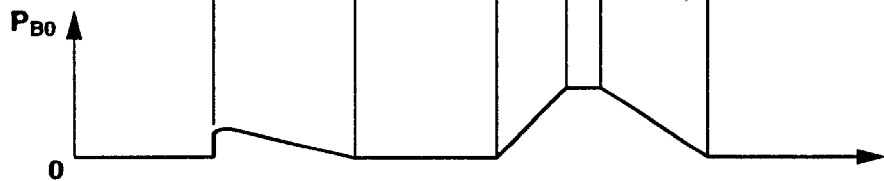
FIG.6C

VEHICULAR VELOCITY CONTROLLING APPARATUS AND METHOD TO FOLLOW UP A PRECEDING VEHICLE RUNNING AHEAD OF VEHICLE

BACKGROUND OF THE INVENTION a) Field of the Invention

The present invention relates to vehicular velocity controlling apparatus and method to follow up a preceding vehicle which is running ahead of the vehicle with an appropriate inter-vehicle distance maintained.

b) Description of the Related Art

A Japanese patent Application First Publication No. Heisei 10-272963 published on Oct. 13, 1998 exemplifies a previously proposed vehicular velocity controlling apparatus to follow up the preceding vehicle at a target inter-vehicle distance. This Japanese Patent Application First Publication corresponds to a U.S. Pat. No. 5,959,572 issued on Sep. 28, 1999.

A target relative velocity $\Delta V^*$ is calculated on the basis of an inter-vehicle distance L and a relative velocity $\Delta V$. The target relative velocity $\Delta V^*$ is subtracted from the vehicular velocity Vt of the preceding vehicle to derive a target vehicular velocity $V^*$. A target driving force is calculated on the basis of the target vehicular velocity $V^*$ to control the vehicular velocity by means of a vehicular velocity controlling section. It is noted that the target driving force includes a target braking force since a negative value of the target driving force means the target braking force.

SUMMARY OF THE INVENTION

In the previously proposed vehicular velocity controlling apparatus, a use of a simple control system can cause the inter-vehicle distance to be converged into a target value thereof. The previously proposed vehicular velocity controlling apparatus has adopted an architecture of a control system of placing a most importance on such a convergence response characteristic on the inter-vehicle distance at a vehicular braking is effected with a large braking pressure set for a vehicular brake system when the inter-vehicle distance to the preceding vehicle becomes so short as to converge the inter-vehicle distance quickly into the target inter-vehicle distance in order to cope with an abrupt interruption of another preceding vehicle from another traffic lane to a front preceding vehicle trap area of the vehicle at the same traffic lane.

Hence, a magnitude of a braking force developed at the vehicular brake system is set in accordance with the inter-vehicle distance to the preceding vehicle. Consequently, a relatively large braking force is acted upon the vehicle at an initial stage of the braking so that a mismatch to a vehicular driver's sense of vehicular driving would occur.

It is, therefore, an object of the present invention to provide vehicular velocity controlling apparatus and method which place a limitation on the braking force developed in the vehicular brake system when the shortened inter-vehicle distance is to be widened to match with the vehicular driver's sense of vehicular driving.

According to one aspect of the present invention, there is provided a vehicular velocity controlling apparatus for an automotive vehicle, comprising: an inter-vehicle distance-detector to detect an inter-vehicle distance from the vehicle the a preceding vehicle which is running ahead of the vehicle; an inter-vehicle distance calculating section that calculates a target vehicular velocity to make a detected value of the inter-vehicle distance substantially, equal to a target inter-vehicle distance; a vehicular velocity detector to detect a vehicular velocity of the vehicle; and avehicular velocity controlling section that adjustably controls the vehicular velocity of the vehicle to make a detected value of the vehicular velocity substantially equal to the target vehicular velocity, the vehicular velocity controlling section including a target braking pressure calculating section that calculates a target braking pressure for a vehicular brake system in accordance with a target deceleration variable calculated on the basis of the target vehicular velocity and the detected value of the vehicular velocity; and a target braking pressure limiter to place a limitation on a rate of increase in the target braking pressure when the target braking pressure is in excess of a predetermined braking pressure threshold value.

According to another aspect of the present invention, there is provided a vehicular velocity controlling method for an automotive vehicle, comprising: detecting an inter-vehicle distance from the vehicle to a preceding vehicle which is running ahead of the vehicle; calculating a target vehicular velocity to make a detected value of the inter-vehicle distance substantially equal to a target inter-vehicle distance; detecting a vehicular velocity of the vehicle; adjustably controlling the vehicular velocity of the vehicle to make a detected value of the vehicular velocity substantially equal to the target vehicular velocity; calculating a target braking pressure for a vehicular brake system in accordance with a target deceleration variable calculated on the basis of the target vehicular velocity and the detected value of the vehicular velocity; and placing a limitation on a rate of increase in the target braking pressure when the target braking pressure is in excess of a predetermined braking pressure threshold value.

This summary of the invention does not necessarily describe all necessary features so that the invention may also be a sub-combination of these described features.

BRIEF DESCRIPTION OF THE DRAWINGS

FIG. 5 is an explanatory view of a target braking pressure $P_B^*$ with respect to a target braking force $F_{OR}$.

FIGS. 6A, 6B, and 6C are integrally a timing chart for explaining an operation of the vehicular velocity controlling apparatus in the first embodiment on a vehicular velocity, a target braking pressure, and an actual braking pressure.

DETAILED DESCRIPTION OF THE PREFERRED EMBODIMENTS

Reference will hereinafter be made to the drawings in order to facilitate a better understanding of the present invention.

(First Embodiment)

Figure 1A:
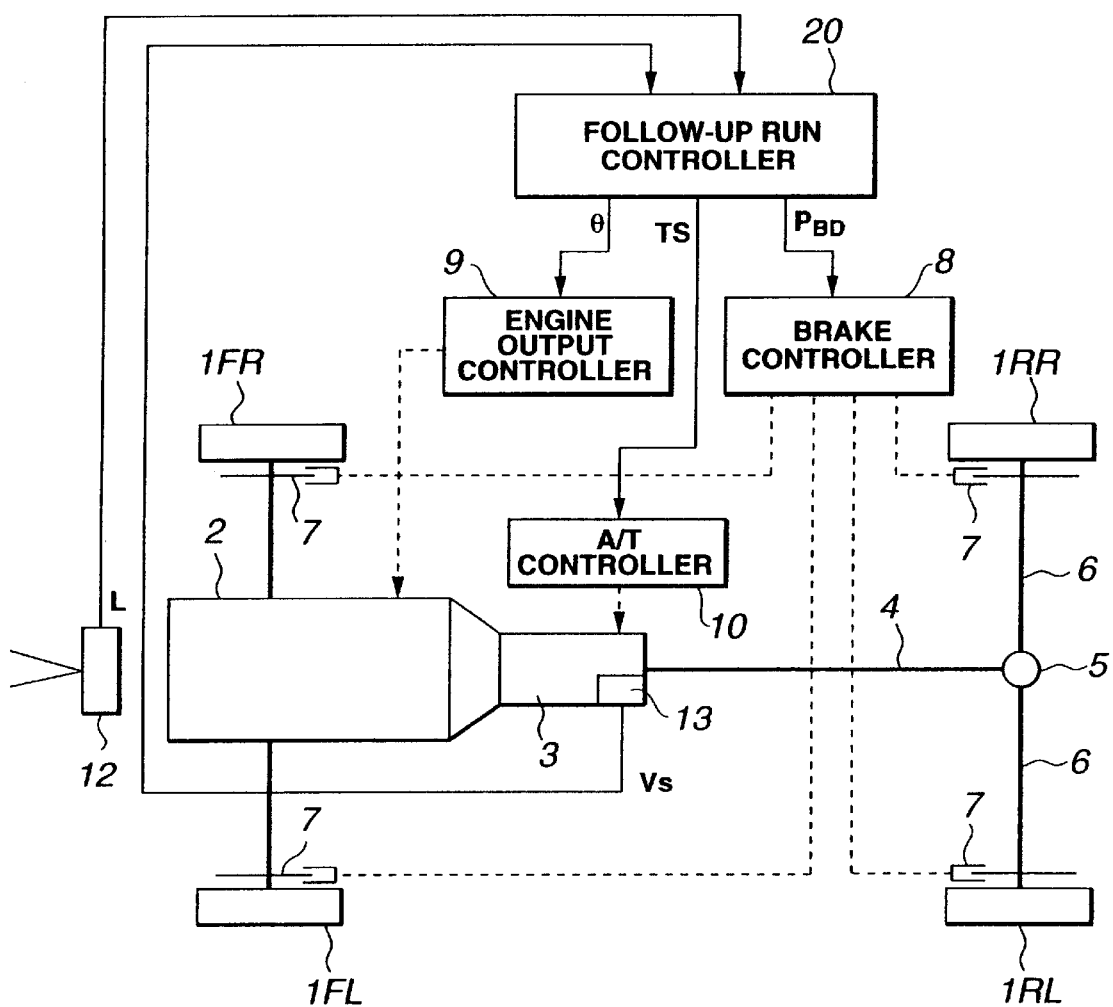
FIG. 1A is a schematic circuit block diagram of a first preferred embodiment of a vehicular velocity controlling apparatus applicable to a rear road wheel drive vehicle.

FIG. 1A shows a schematic circuit block diagram of a vehicular velocity controlling apparatus in a first preferred embodiment according to the present invention.

In FIG. 1A, 1FL and 1FR denote front left and right road wheels as steered vehicles (or non-driven wheels) and 1RL and 1RR denote rear left and right road wheels as driven road wheels.

The rear left and right road wheels 1RL and 1RR are rotationally driven with the driving force of an engine (rotary driving source) 2 transmitted via a vehicular transmission 3, a propeller shaft 4, a final speed reduction gear unit 5, and a wheel axle 6.

A disc brake 7 is disposed around each of the front left and right road wheels 1FL and 1FR and the rear left and right road wheels 1RL and 1RR to develop a braking force to its corresponding road wheels. A brake controller 8 serves to control a braking liquid pressure developed for each of the disc brakes 7 (that is to say, the brake controller 8 actuates a braking actuator to make the actual braking liquid pressure substantially equal to a target braking liquid pressure) in accordance with a magnitude of a braking pressure command value PBD supplied from the follow-up run controller 20 in addition to the braking liquid pressure developed in accordance with a depression depth of a brake pedal (not shown).

The engine 2 is provided with an engine output controller 9 to control an output variable of the engine 2.

A method of controlling an engine output variable may include a method of adjusting an opening angle of an engine throttle valve 2 or a method of adjusting an opening angle of an idle control valve to control an idling revolution speed. However, in the first embodiment, the method of adjusting the opening angle of the throttle valve is adopted.

Furthermore, foran automatic transmission 3, an A/T (transmission) controller 10 is provided to control a gear position of the automatic transmission 3. When the A/T controller 10 receives an OD (an Over Drive) inhibit control signal TS representing a logical value of "1" from the follow-up run controller 20 to be described later, the A/T controller 10 inhibits a gear shift at a fourth-speed (OD) gear position of the automatic transmission 3 to make a down shift therefrom to a third-speed gear position (third gear). With the down shift from the fourth-speed gear position to the third-speed gear position, the OD inhibit signal TS is returned to a logical value of "0" so that an up shift operation occurs to make the up shift from the third-speed gear position to the fourth-speed (OD) gear position.

On the other hand, an inter-vehicle distance sensor 12 (constituted by a radar unit) is disposed on a front lower end portion of a vehicular body of the vehicle as an inter-vehicle distance detector which detects an inter-vehicle distance L to the preceding vehicle which is present at the same traffic lane and is trapped thereby. As the inter-vehicle distance sensor 12, a range measurement instrument to measure an inter-vehicle distance L can be applied utilizing a laser radar to measure the inter-vehicle distance L which sweeps, e.g., a laser beam in a front width-wise direction and receives a reflected laser beam from any object, e.g. , the preceding vehicle which is running ahead of the vehicle.

In addition, a vehicular velocity sensor 13 is disposed on an output axle of the automatic transmission 3 to detect a vehicular velocity V from a revolution speed of the output axle of the automatic transmission 3.

Each output signal of the inter-vehicle distance sensor 12 and the vehicular velocity sensor 13 is inputted to the follow-up run controller 20. The follow-up run controller 20 controls each required function to the brake controller 8, the engine output controller 9, and the A/T controller 10 on the basis of the actual inter-vehicle distance L detected by the inter-vehicle distance sensor 12 and the vehicular velocity V detected by the vehicular velocity sensor 13.

Figure 1B:
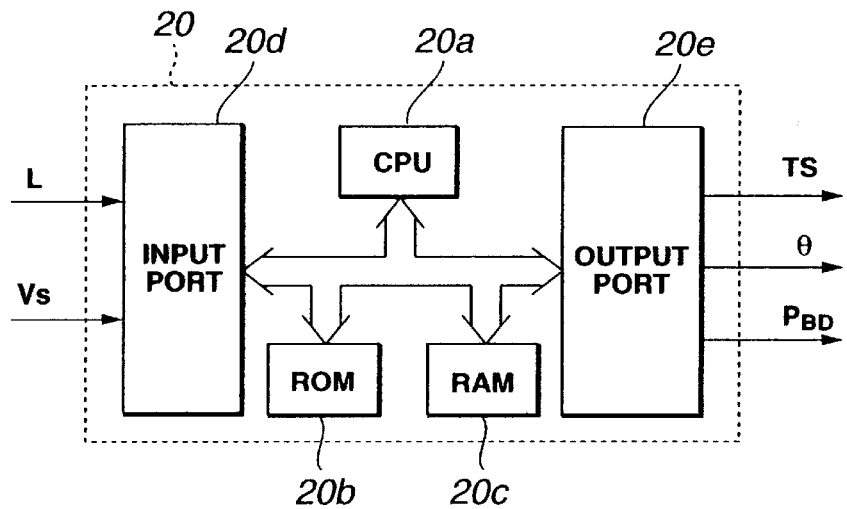
FIG. 1B is a schematic internal circuit block diagram of a follow-up run controller shown in FIG. 1A.

The follow-up run controller 20 includes, in terms of its hardware, a microcomputer having a CPU (Central Processing Unit) 20a, a ROM (Read Only Memory) 20b, a RAM (Random Access Memory) 20c, an Input Port 20d, an Output Port 20c, and a common bus, as shown in FIG. 1B.

Figure 2:
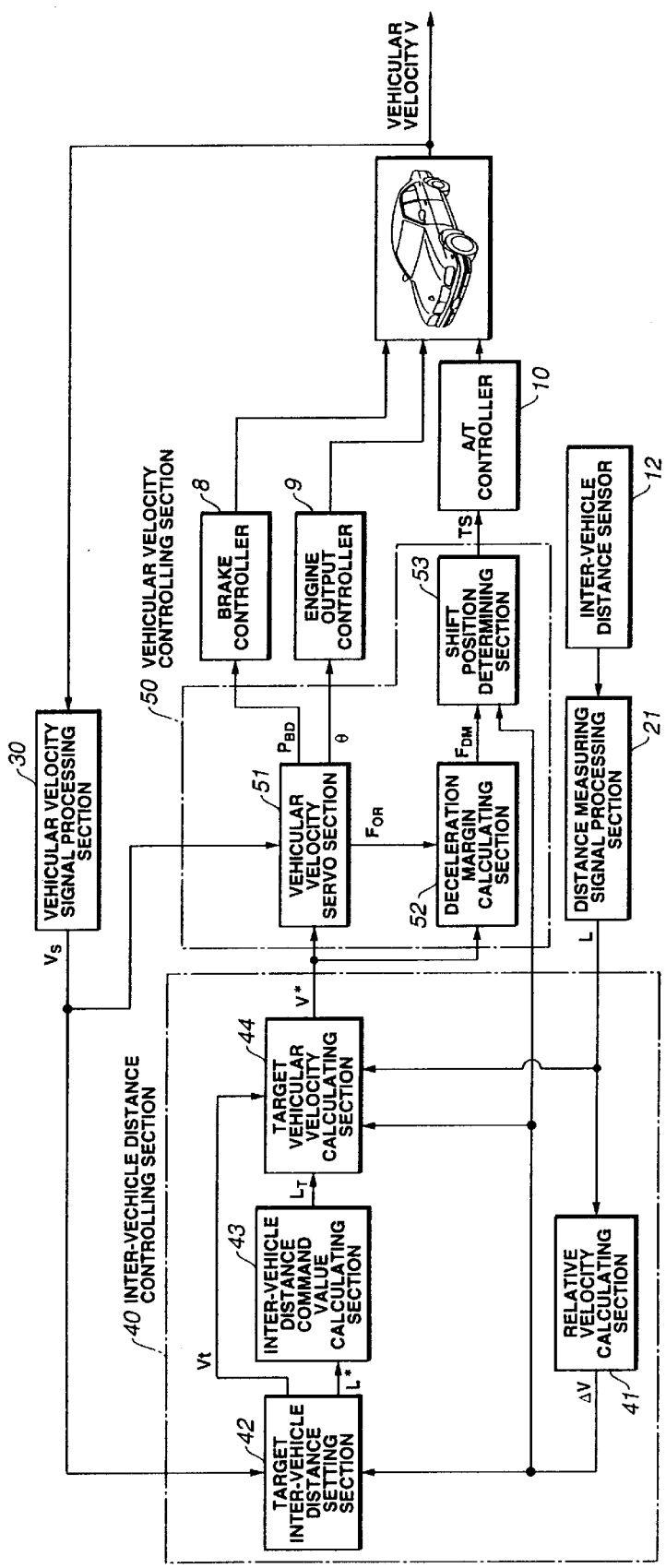
FIG. 2 is a functional circuit block diagram of a specific example of a vehicular velocity controlling section shown in FIG. 1B.

FIG. 2 shows a functional block diagram of the vehicular velocity controlling apparatus in the first embodiment.

The follow-up run controller 20 functionally includes: a distance measuring signal processing section 21 to measure a time duration from a time point at which the inter-vehicle distance sensor 12 is operated to sweep the laser beam in the front width-wise direction to a time point at which the reflected laser beam from the preceding vehicle is received to calculate the inter-vehicle distance L of the vehicle to the preceding vehicle from the measured time duration; a vehicular velocity signal processing section 30 that measures a period of a pulse train signal outputted from a vehicular velocity sensor 13 to calculate the vehicular velocity Vs; an inter-vehicle distance controlling section 40 that calculates a target vehicular velocity V* to maintain the inter-vehicle distance L at a target inter-vehicle distance L* on the basis of the vehicular velocity Vs by the vehicular velocity signal processing section 30 and the inter-vehicle distance L from the distance measuring signal processing section 30; and a vehicular velocity controlling section 50 that controls functions of the brake controller 8, the engine output controller 9, and the transmission (A/T) controller 10 on the basis of the target vehicular velocity V* and the relative velocity ΔV, both of which being calculated by the inter-vehicle distance controlling section 40, to make the vehicular velocity Vs substantially equal to the target vehicular velocity V*.

The inter-vehicle distance controlling section 40 includes: a relative velocity calculating section 41 that calculates the relative velocity ΔV of the vehicle to the preceding vehicle on the basis of the inter-vehicle distance L inputted from the distance measuring signal processing section 21; a target inter-vehicle distance setting section 42 that calculates a target inter-vehicle distance L* between the preceding vehicle and the vehicle on the basis of the vehicular velocity Vs inputted from the vehicular velocity signal processing section 30; and an inter-vehicle distance command value calculating section 43 that calculates the target vehicular velocity V* to make the inter-vehicle distance L substantially equal to the target inter-vehicle distance L* on the basis of the relative velocity ΔV calculated by the relative velocity calculating section 41 and the target inter-vehicle distance L* calculated by the target inter-vehicle distance setting section 42.

The relative velocity calculating section 41 is constituted by a band pass filter (BPF) which processes the inputted inter-vehicle distance L in a, e.g., a band pass filter.

The band pass filter has its transfer function that can be expressed in the following equation (1).

Since a differential term of a Laplace transform operator s is included in a numerator of the equation (1), the relative velocity ΔV is substantially approximated from the differentiation of the inter-vehicle distance L.

$$F(s)=\omega^2 s/(s^2+2\zeta c\omega cs+\omega c^2) \tag{1}$$

In the above equation (1), $\omega c=2\pi fc$ and $\zeta c$ denotes a damping factor.

As described above, since the band pass filter having the transfer function as given by the equation (1) is used as the relative velocity calculating section 41, the calculation of the relative velocity ΔV described above can avoid such an inconvenience case that is weak in a noise interference and that gives an ill influence on a vehicular dynamic (vehicular behavior) such as fluctuations occur in a vehicular body during the follow-up run control in a case where a simplified differential calculation is carried out from a variation rate of the inter-vehicle distance L so as to calculate the relative velocity ΔV. It is noted that a cut-off frequency fc in the equation (1) is determined according to a magnitude of a noise component included in the inter-vehicle distance L and an allowance value of an acceleration variation in a longitudinal direction of the vehicular body in a short period of time.

In addition, the calculation of the relative velocity ΔV may alternatively be carried out by a differential processing using a high pass filter to the inter-vehicle distance L in place of the band pass filter described above.

In addition, the target inter-vehicle distance setting section 42 calculates the target inter-vehicle distance L* in accordance with the following equation (2) from a vehicular velocity V* of the preceding vehicle (Vt=Vs+ΔV) calculated by an addition of the vehicular velocity Vs to the relative velocity ΔV and a time duration To (so-called, inter-vehicle time duration) during which the vehicle has reached to a position Lo (meters) behind the present position of the preceding vehicle.

$$\text{That is to say, } L^*=Vt\times To+Ls \tag{2}$$

Since a concept of the inter-vehicle time duration is introduced into the calculation of the target inter-vehicle distance L*, the target inter-vehicle distance L* is set in such a manner that as the vehicular velocity becomes faster, the inter-vehicle distance becomes large.

In the equation (2), Ls denotes an initial inter-vehicle distance when the vehicle stops.

Furthermore, the inter-vehicle distance calculating section 43 calculates the command value $L_T$ of the inter-vehicle distance on the basis of the actual inter-vehicle distance L, the target inter-vehicle distance L*, and the relative velocity ΔV to follow up the preceding vehicle maintaining the inter-vehicle distance L at its target value L*. Specifically, the target vehicular velocity V* is calculated in accordance with the following equation (3). More specifically, a filter processing for the inputted target inter-vehicle distance L* in a second order lag form is carried out in accordance with a reference model $G_T(s)$ expressed in the equation of (3) using the damping factor $\zeta$ and the specific angular frequency $\omega n$ determined for the response characteristic in the inter-vehicle distance system to be the target vehicular velocity so that the inter-vehicle distance command value $L_T$ is calculated.

$$G_T(s)=\omega n^2/(s^2+2\zeta\omega ns+\omega n) \tag{3}$$

Furthermore, the target vehicular velocity calculating section 44 calculates the target vehicular velocity V* using a feedback compensator on the basis of the inputted inter-vehicle distance command value $L_T$.

That is to say, the target relative velocity ΔV* is first calculated, as expressed in the equation (4), by subtracting a liner connection between a value of a multiplication of a distance control gain fd and a deviation (L*−L) between the target inter-vehicle distance L* and the actual inter-vehicle distance L and a value of the multiplication of a velocity control gain fv with the relative velocity ΔV from a vehicular velocity Vt of the preceding vehicle.

$$\text{Namely, } \Delta V^*=Vt-\{fd(L^*-L)+fv\Delta V\} \tag{4}$$

The vehicular velocity controlling section 50 controls the opening angle θ of the throttle valve of the engine through the engine output controller 9, the gear position of the of the transmission 3 through the A/T controller 10, and outputs the command value $P_{BD}$ to the brake controller 8 so that the vehicular velocity Vs is made substantially equal to the target vehicular velocity V*.

The vehicular velocity controlling section 50 includes: a vehicular velocity servo controlling section 51 which calculates a target acceleration α1 and a disturbance estimated value α2 to make the vehicular velocity Vs substantially equal to the inputted target vehicular velocity V* and to calculate a target braking force For by multiplying these deviations by a vehicular body mass M; a deceleration force margin calculating section 52 that calculates a deceleration force margin $F_{DM}$ on the basis of the target braking force For and the target vehicular velocity V* calculated at the vehicular velocity servo section 51; andashiftposition determining section 53 that carries out a selection of an appropriate gear position to be shifted on the basis of the deceleration force margin $F_{DM}$ calculated by the deceleration force margin calculating section 52 and the relative velocity ΔV calculated by the relative velocity calculating section 41.

Figure 3:
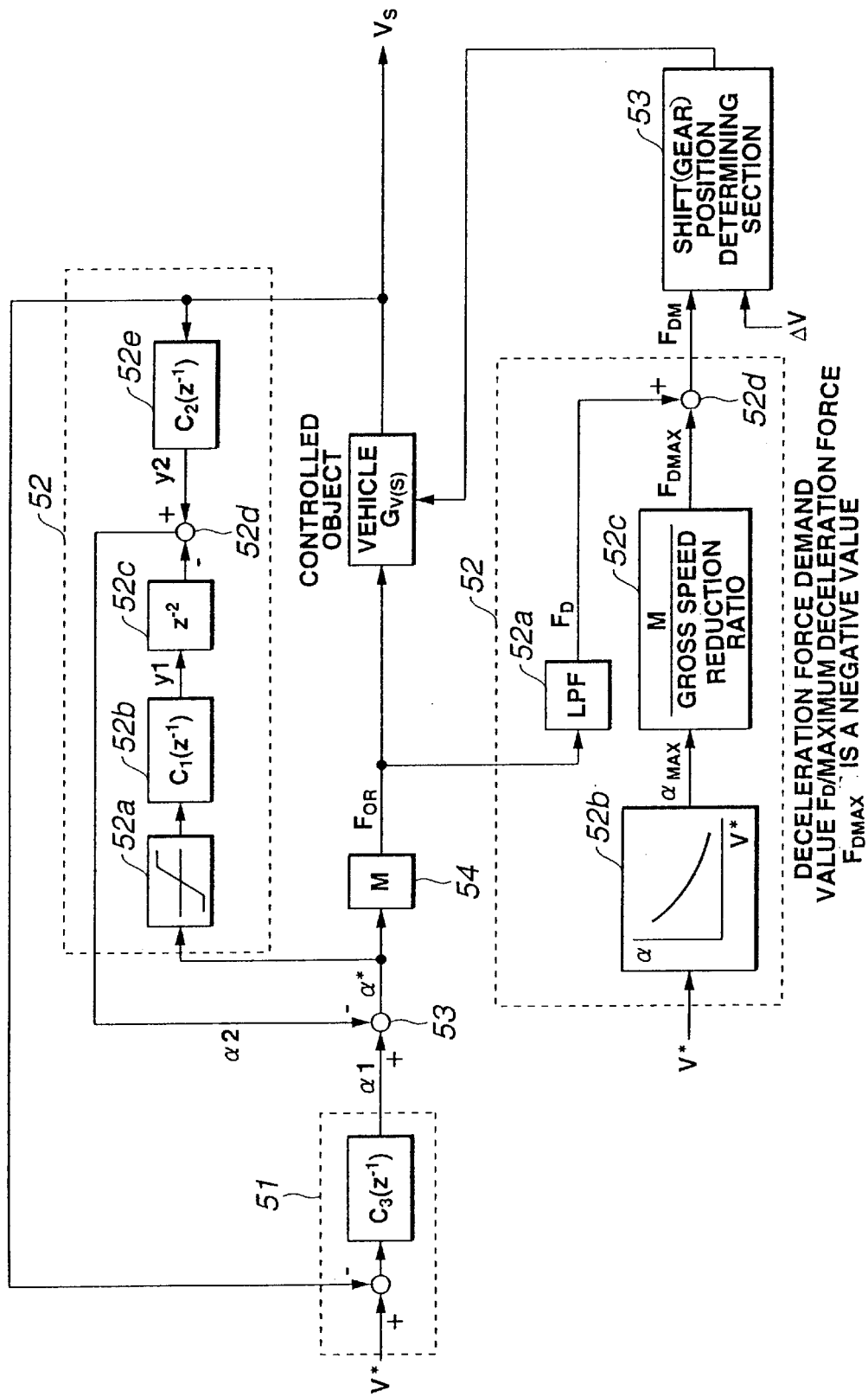
FIG. 3 is a functional circuit block diagram of a specific example of a vehicular velocity controlling section.

The vehicular velocity servo section 51 is designed by using a robust matching control method to make a serve system robust to an external disturbance such as a variation in a gradient of a road surface on which the vehicle is running. The servo system 51 can be described as shown in FIG. 3 if a transfer characteristic of a controlled object is supposed as a pulse transfer function $P(z^{-1})$. In FIG. 3, z denotes a delay operator and $P(z^{-1})$ represents a sampled value prior to one sampling period in a form multiplied by $z^{-1}$.

FIG. 3 illustrates a typical servo system including: a model matching compensator 51; a robust compensator 52 as an external disturbance compensator; a subtractor 53 to subtract the disturbance estimated value α2 outputted by the robust compensator 52 from an acceleration (the term of acceleration includes a deceleration since a minus acceleration means the deceleration) command value outputted by a model matching compensator 51 to calculate a target acceleration value α*; and a multiplier 54 that multiplies the target acceleration α* by the vehicular body mass M.

It is noted that the model matching compensator 51 is set so that a responsive characteristic of the controlled object when the target vehicular velocity V* is inputted and the actual vehicular velocity Vs is outputted is made substantially equal to the characteristic of the reference model $H(z^{-1})$ having a predetermined first order lag and a dead time.

Suppose that an element whose input is the target acceleration α* and whose output is the actual vehicular velocity Vs is an object to be controlled. A pulse transfer function $P(z^{-1})$ can be represented as a product between an integration element $P1(z^{-1})$ described in the following equation (5) and a dead time element $P2(z^{-1})=z^{-2}$. It is noted that T denotes a sampling period.

$$P1(z^{-1}) = T \cdot z^{-1}/(1-z^{-1}) \tag{5}$$

At this time, compensators $C1(z^{-1})$ and $C2(z^{-1})$ constituted by the robust compensator 52 are represented by the following equations (6) and (7).

In the equations (6) and (7), $\gamma = \exp(-T/Tb)$ $$C1(z^{-1}) = (1-\gamma) \cdot z^{-1}/(1-\gamma \cdot z^{-1}) \tag{6}$$

$$C2(z^{-1}) = (1-\gamma) \cdot (1-z^{-1})/T \cdot (1-\gamma \cdot z^{-1}) \tag{7}$$

If the dead time of the controlled object is neglected and the reference model is a first order low pass filter having a time constant Ta, a feedback compensator C3 ($C3(z^{-1})$) for the model matching compensator 51 gives a constant as expressed in the following equation (8).

$$C3(z^{-1}) = K = \{1-\exp(-T/Ta)\}/T \tag{8}$$

A deceleration force margin calculating section 52 includes: a filter (LPF) 52a; a maximum deceleration calculating section 52b; a multiplier 52b; and a subtractor 52d.

The filter 52a filters the target driving force $F_{OR}$ through the LPF having, e.g., a cut-off frequency of 0. 5 Hz to output the deceleration force demand value $F_D$ to the subtractor 52d.

The maximum deceleration calculating section 52b refers to a characteristic memory table (in a two dimensional array form) representing a relationship of the deceleration a to the vehicular velocity V when the target vehicular velocity V* is inputted and when the gear position of the automatic transmission 3 is in the ifourth-speed (OD) gear position and the engine throttle valve is completely closed in response to the target vehicular velocity V* to calculate the maximum deceleration $\alpha_{MAX}$. The multiplier 52c calculates the maximum deceleration force $F_{DMAX}$ in the fourth-speed (OD) gear position by multiplying the maximum deceleration $\alpha_{MAX}$ with a division value (quotient) of the maximum deceleration $\alpha_{MAX}$ by a gross deceleration (speed reduction) ratio (fourth-speed gear ratio×final gear ratio).

The subtractor 52d subtracts the maximum deceleration force $F_{DMAX}$ from the deceleration force demand value $F_D$.

Furthermore, the shift position determining section 53 receives the relative velocity $\Delta V$ calculated by the relative velocity calculating section 41, previously set down shift threshold value $TH_D$, and up shift threshold value $TH_U$, and outputs the OD inhibit control signal TS having the logical value of "1" to inhibit the fourth-speed (OD) gear position when the gear position of the automatic transmission 3 is placed at the fourth-speed (OD) gear position, $F_{DM} \leq TH_D$, and $\Delta V \leq 0$, and outputs the OD inhibit control signal TS having the logical value of "0" to enable the fourth-speed (OD) gear position when $F_{DM} \geq TH_U$ and $\Delta V > 0$ when the gear position of the automatic transmission 3 is placed at the third-speed gear position.

Figure 4:
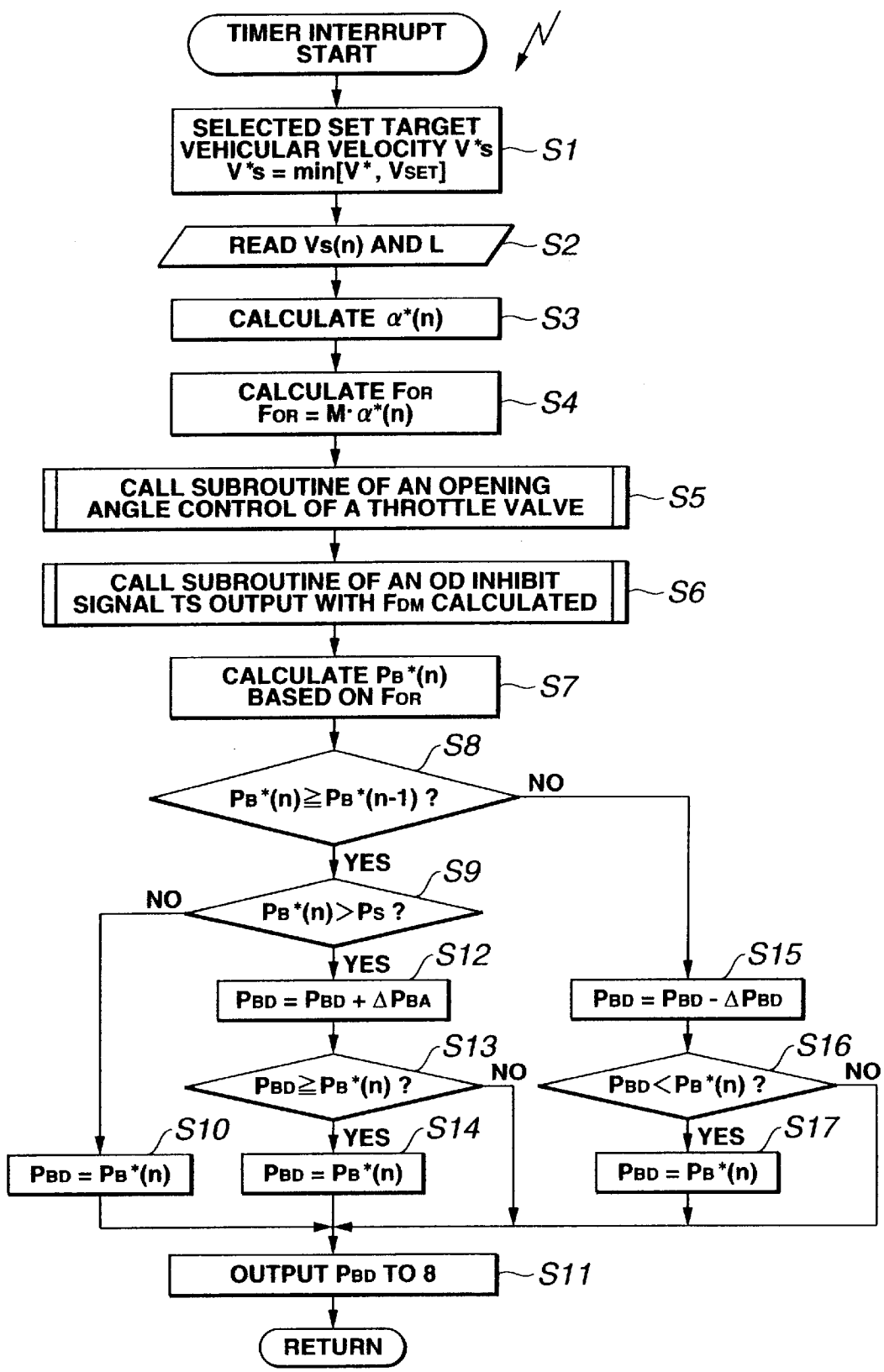
FIG. 4 is an operational flowchart representing an example of a vehicular velocity control procedure executed in the case of the first preferred embodiment.

Therefore, the vehicular velocity controlling section 50 executes a timer interrupt routine called a vehicular velocity control procedure to a predetermined main routine for each predetermined (sampling) period of time (for example, 10 milliseconds) shown in FIG. 4.

As shown in FIG. 4, at a step S1, the CPU 20a of the follow-up run controller 20 reads the target vehicular velocity V* calculated by the inter-vehicle distance controlling section 40, reads a set vehicular velocity $V_{SET}$ by the vehicular driver, selects one of the read target vehicular velocity $V_{SET}$ which is smaller than the other to set the selected vehicular velocity value as a selected target vehicular velocity V*s; V*s=min [V*, $V_{SET}$].

Next, the routine goes to a step S2.

At the step S2, the CPU 20a of the follow-up run controller 20 viz., the vehicular velocity controlling section 51 reads the vehicular velocity controlling section reads the vehicular velocity Vs(n) and the actual inter-vehicle distance L(n).

At the step S3, the CPU 20a of the follow-up run controller 20 (viz., the vehicular velocity controlling section 51) performs the calculations shown in the equations (9) and (10) corresponding to the compensators $C1(z^{-1})$ and $C2(z^{-1})$ in the robust compensator 52 to calculate the compensator outputs $y_1(n)$ and $y_2(n)$ using equations (9) and (10), calculates the disturbance estimated value $\alpha_2(n)$ using an equation (11), calculates the compensator output $\alpha_1$ using an equation (12) corresponding to a model matching compensator 51 based on the selected target vehicular velocity V*s and vehicular velocity Vs, calculates the target acceleration $\alpha^*$ using the equation (13) on the basis of the calculated compensator outputs $y_1(n)$, $y_2(n)$, and $\alpha 1$, stores and updates the value of $\alpha^*$ into a present value memory area of the target acceleration as the present target acceleration $\alpha^*(n-1)$ into a previous memory area of the target acceleration.

$$y_1(n) = \gamma \cdot y_1(n-1) + (1-\gamma) \cdot \alpha^*(n-1) \tag{9}$$

$$y_2(n) = \gamma y_2(n-1) + (1-\gamma)/\{T \cdot Vs(n-1)\} \tag{10}$$

$$\alpha_2(n) = y_2(n) - y_1(n) \tag{11}$$

$$\alpha_1(n) = K \cdot (Vs^*(n) - Vs(n)) \tag{12}$$

$$\alpha^* = \alpha_1(n) - \alpha_2(n) \tag{13}$$

Next, the routine goes to a step S4.

At the step S4, the vehicular velocity controlling section 50 multiplies the target driving force $F_{OR}$ with the vehicular body mass M to calculate the value of $F_{OR}(=M \cdot \alpha^*(n))$.

At a step S5, the vehicular velocity controlling section 50 calculates a target engine torque $T_E$ from the calculated target driving force $F_{OR}$, refers to a non-linear characteristic data map previously stored for each engine revolution speed $N_E$ based on a target engine torque $T_E$ to derive and output the opening angle θ of the throttle valve and outputs it to the engine output controller 9.

At the next step S6, the vehicular velocity calculating section 50 performs a calculation processing such that the maximum deceleration force $\alpha_{OD}$ at the fourth-speed (OD) gearpositionis calculated by referring to a maximum deceleration calculation map previously stored on the basis of the target vehicular velocity V*, calculates a maximum deceleration force $F_{BMAX}$ by multiplying the vehicular body mass M/gross speed-reduction ratio with the maximum deceleration $\alpha_{MAX}$, calculates a required deceleration force $F_D$ through the filtering for the target driving force $F_{OR}$, calculates a deceleration force margin $F_{DM}$ by subtracting the maximum deceleration force $F_{BMAX}$ from the required deceleration force $F_D$, outputs the OD inhibit control signal TS having the logical value of "0" to the A/T controller 10 when $F_{BM} \geq TH_U$ (up shift threshold value) and $\Delta V < 0$ to perform the up shift and down shift controls for the vehicular velocity of the automatic transmission 3.

At the next step S7, the vehicular velocity controlling section 50 refers to the target braking pressure calculation map (in the two-dimensional array form) shown in FIG. 5 on the basis of the target braking force $F_{OR}$ to calculate the target braking pressure P(n)* into the present target braking pressure memory area, and stores and updates the previously stored target braking pressure $P_B*(n-1)$ into the previously calculated target braking pressure memory area.

It is noted that a lateral axis of the target braking pressure calculation map shown in FIG. 5 denotes the target braking force $F_{OR}$, a longitudinal axis of the target braking pressure calculation map denotes the target braking pressure $P_B*$, and the target braking pressure $P_B*$ maintains at zero while the target braking force $F_{OR}$ is positive and is negative above a predetermined value of–Fs. If $F_{OR}<-Fs$, a liner increase in the target braking pressure $P_B*$ is found in proportion to a negative increase of the target braking force $F_{OR}$.

Next, at a step S8, the vehicular velocity controlling section 50 determines if $P_B*(n) \geq P_B(n-1)$.

This means that the CPU 20a of the follow-up run controller 20 determines if the present braking pressure state is in the pressure increase state.

If $P_B*(n) \geq P_B*(n-1)$ (Yes) at the step S8, the vehicular velocity controlling section 50 determines that the braking pressure of the vehicular brake system falls in a pressure increase state and the routine goes to a step S9.

At the step S9, the vehicular velocity controlling section 50 determines if $P_B*(n)>Ps$, wherein Ps denotes a threshold value of the braking pressure.

If $P_B*(n)>Ps$ (Yes) at the step S9, the routine goes to a step S12 and the braking pressure PB is set as follows: $P_{BD}=P_{BD}+\Delta P_{BA}$, wherein $\Delta P_{BA}$ denotes a predetermined value to determine a gradient of an increase in the braking pressure command value $P_{BD}$ stored in a braking pressure command value memory area since the present target braking pressure $P_B*(n)$ is so large as to give the vehicular driver to a mismatch feeling from the vehicular driver's sense of driving.

If $P_B*(n) \leq Ps$ (No) at the step S9, the vehicular velocity controlling section 51 determines that the present target braking pressure $P_B*(n)$ is so small as to give the vehicular driver to the match to the vehicular driver's sense and the routine goes to a step S10 in which the present target braking pressure is stored and updated to the braking pressure command value $P_{BD}$ to the braking pressure command value memory area and the routine goes to a step S11.

At the step S11, the vehicular velocity controlling section 51 outputs the braking pressure command value $P_{BD}$ stored in the braking pressure command value $P_{BD}$ stored in the braking pressure command value memory area to the braking controller 8, and the timer interrupt routine is ended, and the routine is returned to the predetermined main routine.

On the other hand, the routine goes from the step S12 to a step S13.

At the step S13, the vehicular velocity controlling section 51 determines if the braking pressure command value $P_{BD}$ calculated at the step S12 is equal to or larger than the present target braking pressure $P_B*(n)$ calculated at the step S7 ($P_{BD} \geq P_B*(n)$).

If $P_{BD} \geq P_B*(n)$ (Yes) at the step S13, the routine jumps to the step S11.

At the step S14, the present target braking pressure $P_B*(n)$ is stored to update the braking pressure command value memory area as the braking pressure command value $P_{BD}$ ($P_{BD}=P_B*(n)$) After the step S14, the routine goes to the step S11 described above.

On the other hand, if the result of determination at the step S9 indicates that $P_B*(n)<P_B*(n-1)$, the vehicular velocity controlling section 50 determines that the present braking pressure state is in the pressure decrease state and the routine goes to a step S15.

At the step S15, the braking pressure command value $P_{BD}$ is stored into the braking pressure command value memory area to update the previously stored braking pressure command value by a subtraction a predetermined value $\Delta P_{BD}$ to determine a pressure decrease gradient previously set in the braking pressure command value $P_{BD}$ from the stored braking pressure command value $P_{BD}$ as follows: $P_{BD}=P_{BD}-\Delta P_{BD}$.

Then, the routine goes to a step S16.

At the step S16, the vehicular velocity controlling section 50 determines if $P_{BD}<P_B*(n)$. If $P_{BD}<P_B*(n)$ (yes) at the step S16, the routine goes to a step S17 in which $P_{BD}=P_B*(n)$, namely, the present target braking pressure $P_B*(n)$ is stored into the braking pressure command value memory area as the braking pressure command value $P_{BD}$ to update the braking pressure command value $P_{BD}$ and the routine goes to the step S11.

If $P_{BD}<P_B*(n)$ No at the step S16, the routine goes to the step S11.

In FIG. 4, the steps S1 through S17 correspond to target braking pressure calculating means, the steps S8 Ithrough S17 correspond to target braking pressure limiting means, the steps S8 through S14 correspond to target braking pressure increase limiting means; and the step S8 and the steps S15 through S17 correspond to target braking pressure decrease limiting means.

Next, an operation of the first embodiment described above will be described with chief reference to FIGS. 6A through 6C.

Suppose now that the vehicle is running straightly on a straight road surface with the preceding vehicle which is running at a cruise velocity (running at a constant velocity) on the same traffic lane of, for example, a city street as the vehicle trapped at a time point t0, as shown by FIG. 6A and the vehicular velocity Vs maintained at the target inter-vehicle distance L*.

In this state, since the actual inter-vehicle distance L detected by the inter-vehicle distance sensor 1 is made substantially equal to the target inter-vehicle distance L* and the preceding vehicle is cruising at the constant vehicular velocity, the inter-vehicle distance command value $L_T$ is substantially coincident with the actual inter-vehicle distance L. Consequently, the relative velocity $\Delta V$ calculated by the relative velocity calculating section 41 of the inter-vehicle distance controlling section 40.

The target braking pressure $P_B*(n)$ calculated at the step S7 maintains approximately zero as shown in FIG. 6B. Then, the routine shown in FIG. 4 goes to the step S10 via the steps S8 and S9. Hence, the braking pressure command value $P_{BD}$ is substantially made equal to the target braking pressure $P_B*(n)$ which indicates approximately zero as shown by FIG. 6C. Hence, the disc brake 7 is held at an non-operation state in the braking controller 8.

At a time point t1 at which the vehicle is running at the constant vehicular velocity to follow up the preceding vehicleis, forexample, interrupted by the other vehicle from another traffic lane to the front detection zone of the vehicle so that the vehicle is in a relatively moderate deceleration state.

At this time, the inter-vehicle distance L detected by the inter-vehicle distance sensor 12 becomes moderately short as compared with the target inter-vehicle distance L*. Hence, the target vehicular velocity V* is moderately decreased which is calculated by the target vehicular velocity calculating section 44 of the inter-vehicle distance controlling section 40.

Hence, the target acceleration $\alpha*(n)$ calculated at the step S3 of FIG. 4 indicates negative. The target driving force $F_{OR}$ calculated at the step S4 indicates negative below the minus predetermined value−Fs.

In this state, the opening angle θ of the throttle valve is controlled under the full close state at the step S5.

Then, the OD inhibit control signal TS having the logical value of "1" is outputted at the step S6. The A/T controller 10 is operated to make the gear position of the transmission 3 down shift to the third-speed gear position. The target braking pressure $P_B^*(n)$ calculated at the step S7 becomes smaller than the braking pressure threshold value Ps and becomes a pressure decrease state. Hence, the routine goes from the step S8 to the step S9. However, since the target braking pressure $P_B^*(n)$ indicates the smaller value than the braking pressure threshold value Ps shown in FIG. 6A, the routine goes from the step S9 to the step S10 in which the calculated target braking pressure $P_B^*(n)$ is set directly as the braking pressure command value $P_{BD}$, as shown in FIGS. 6B and 6C. This braking pressure command value $P_{BD}$ is outputted to the braking controller 8. The braking force through each disc brake 7 causes the moderate braking force to be developed so that the vehicular running state is transferred to the deceleration state. The deceleration control such as to make the actual inter-vehicle distance L to substantially equal to the target inter-vehicle distance L* so that the inter-vehicle distance L can be widened.

Thereafter, at a time point t2, the preceding vehicle is transferred from the deceleration state thereof to the cruise run state thereof, the vehicular velocity of the controlled vehicle becomes constant.

Thereafter, at a time point t3 shown in FIG. 6A, the other vehicle is interrupted from the other traffic lane into the front detection zone of the inter-vehicle distance sensor 12 so that the inter-vehicle distance L becomes abruptly short as compared with the target inter-vehicle distance L*. At this time, the target vehicular velocity V* calculated by the target vehicular velocity calculating section of the inter-vehicle distance controlling section 40 is abruptly reduced.

Hence, the target acceleration α*(n) calculated at the step S3 indicates negatively large representing the large deceleration. Accordingly, the target driving force $F_{OR}$ indicates the negatively large. The opening angle θ calculated at the step S5 for the throttle valve is controlled in a full close condition. Then, the deceleration force margin $F_{BM}$ calculated at the step S6 indicates a negatively large so as to be lower than the down shift value $TH_D$. Hence, the OD inhibit control signal TS having the logical value of "1" is outputted to the A/T controller 10. Hence, the down shift from the fourth-speed gear position to the third-speed gear position occurs in the transmission 3 to increase the engine braking. Hence, the target braking pressure $P_B(n)^*$ calculated at the step S7 is abruptly increased as shown in FIG. 6B and is in excess of the braking pressure threshold value Ps.

Under the present condition, the routine goes from the step S8 to the step S9 via the step S12. Thus, thebraking pressure command value $P_{BD}$ is increased by the predetermined value $\Delta P_{BA}$. Hence, the braking force developed on each disc brake 7 is maintained at a constant value.

Thereafter, as the inter-vehicle distance L approaches gradually to the target inter-vehicle distance L* at a time point t5, the target driving force $F_{OR}$ gradually approaches to zero. If the target braking pressure $P_B^*(n)$ accordingly starts to be decreased as shown in FIG. 6B, the routine goes from the step S8 to the step S15. Since the braking pressure command value $P_{BD}$ is in the decrease state by the gradient of the predetermined value $\Delta P_{BD}$ as shown in FIG. 6C, the braking force of each disc brake 7 is gradually decreased.

At a time point of t6, the braking pressure command value $P_{BD}$ is maintained at the target braking pressure $P_B^*$. The braking force developed at each disc brake 7 is increased. When the deceleration force margin $F_{BM}$ is above the up shift threshold value $TH_D$, the CD inhibit control signal having the logical value of "0" is outputted to the A/T controller 10 and the transmission 3 is shifted up to the fourth-speed (OD) gear position. Thereafter, the vehicular running condition is transferred to the cruise run state.

(Second Embodiment)

Figure 7:
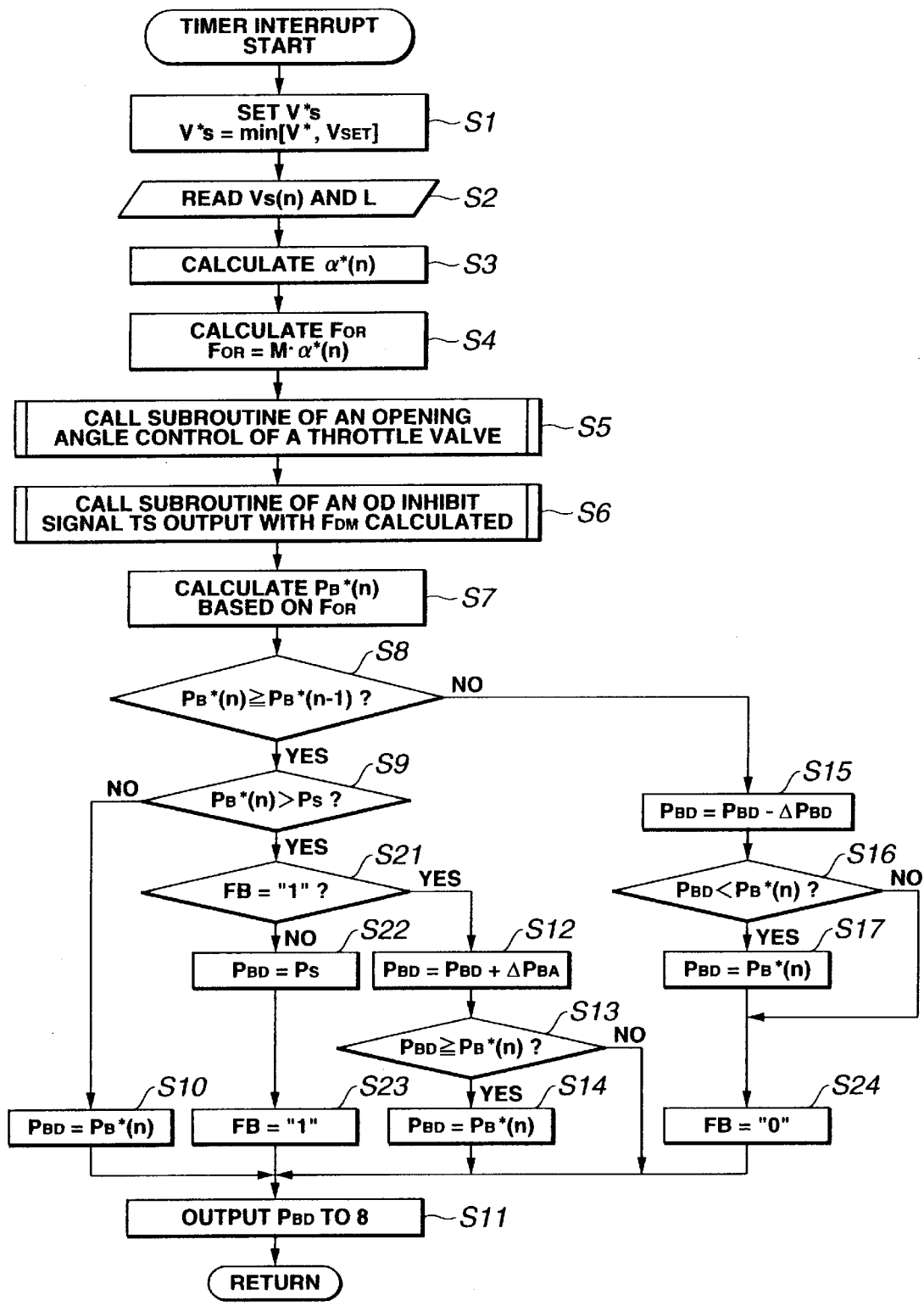
FIG. 7 is an operational flowchart for explaining another example of the vehicular velocity control procedure in a vehicular velocity controlling section of a second preferred embodiment of the vehicular velocity controlling apparatus.

FIG. 7 shows an operational flowchart of the vehicular velocity control procedure executed in a second preferred embodiment according to the present invention.

In the second embodiment, an initial response characteristic is improved to an abrupt increase of the target braking pressure $P_B^*(n)$.

In the vehicular velocity control procedure performed by the vehicular velocity controlling section 50 in the case of FIG. 4 described in the first embodiment, steps S21, S22, and S23 are newly interposed in the case of the second embodiment as shown in FIG. 7 between the steps S9, S11, and S12.

In details, at the step S21, the vehicular velocity controlling section 50 determines if an initial state pass flag FB representing that the present time has passed an initial stage of the pressure increase state when set to "1".

If FB="1" (Yes) at the step S21, the vehicular velocity controlling section 50 determines that the present time of the vehicular brake system has passed the initial stage of the braking pressure increase and the routine goes to the step S22. At the step S22, the vehicular velocity controlling section 50 sets the braking pressure threshold value of Ps as the braking pressure command value $P_{BD}$. The set command value $P_{BD}$ at the step S21 is outputted at the step S11 with the initial pressure increase pass flag of FB set to "1" at the step S23. It is noted that a step S24 is interposed between the steps S16 and S17 and the step S11 to reset the initial pressure increase pass flag of FB to "0", as shown in FIG. 7.

The other same numbered steps in FIG. 7 as those shown in FIG. 4 have the same functions as described in the first embodiment. In addition, the other structures are the same as those described in the first embodiment. Hence, the detailed description thereof will herein be omitted.

In the second embodiment, in a case where the inter-vehicle distance L is reduced at a relatively moderate pace, the target acceleration α*(n) calculated at the step S3 of FIG. 7 indicates the relatively small value in the negative direction so that the target driving force $F_{OR}(n)$ calculated at the step S4 is negatively below the minus predetermined value−Fs. The target braking pressure $P_B^*(n)$ calculated at the step S7 is negatively below the predetermined value of Ps. Hence, at this time, in the same manner as described in the first embodiment, the routine goes to the step S10 in which the target braking pressure $P_B(n)^*$ is directly set as the braking pressure command value.

Hence, the actual braking force at each disc brake 7 is controlled in accordance with the target braking pressure P*(n).

However, in a case where the inter-vehicle distance L is abruptly decreased such as the case where the preceding vehicle is interrupted at the short inter-vehicle distance from the other traffic lane, the target driving force $F_{OR}(n)$ calculated at the steps S3 and S4 are abruptly increased in the negative direction at the vehicular velocity control procedure shown in FIG. 4 in the negative direction.

Hence, the target braking pressure $P_B^*(n)$ calculated at the step S7 becomes larger than the braking pressure threshold value Ps.

Hence, the routine goes from the step S8 to the step S21 via the step S9. Since the initial state pass flag FB is reset to "0" at the step S21, the routine goes to the step S22. The braking pressure threshold value Ps is set as the braking pressure command value $P_{BD}$. Then, the routine goes to the step S23 to set the initial state pass flag FB to "1". Then, as shown by a time point of t11 in FIG. 8, the braking pressure command value $P_{BD}$ which is equal to the braking pressure threshold value Ps is outputted to the braking controller 8. Hence, the braking pressure of each disc brake 7 is increased up to a value corresponding to the braking pressure threshold value Ps. Hence, since the relatively large braking force is developed at the initial stage of the increase in the braking pressure can be improved, and the deceleration control such that the inter-vehicle distance can immediately be widened with no continuation of the abrupt decrease state of the inter-vehicle distance L.

Figure 8:
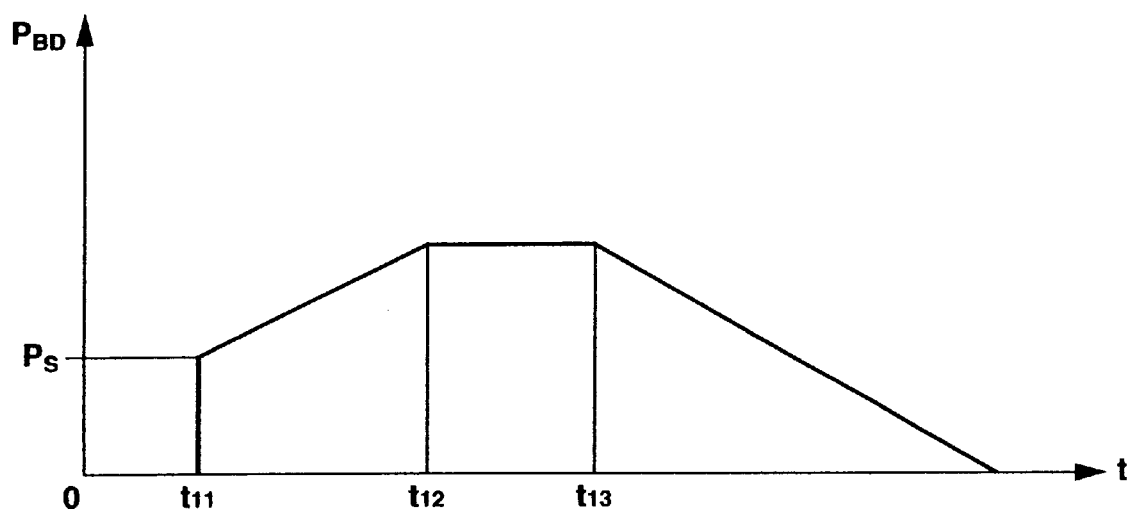
FIG. 8 is a timing chart for explaining a variation in a braking pressure command value during an abrupt braking in the second embodiment.

Then, after the present interrupt timer routine shown in FIG. 7 is executed for the predetermined time, the vehicular velocity control procedure in FIG. 7 is restarted. At this time, since the initial state pass flag FB is set to "1", the routine shown in FIG. 8 goes from the step S21 to the step S12. In the same way as described in the first embodiment, the braking pressure command value $P_{BD}$ is increased by the predetermined value $\Delta P_{BD}$ in the same manner as described in the first embodiment. Then, whenever the timer interrupt period is passed, the increase rate corresponding to the predetermined value $\Delta P_{BA}$ of the braking pressure command value $P_{BD}$ is repeated as shown in FIG. 8.

Then, at a time point t12 at which the braking pressure command value $P_{BD}$ has reached to the target braking pressure $P_B^*(n)$, the braking pressure command value $P_{BD}$ is thereafter maintained at the target braking pressure of $P_B^*(n)$.

Thereafter, when the actual inter-vehicle distance L has approached to the target inter-vehicle distance L* and the braking pressure $P_B^*(n)$ is started to be decreased at a time point t13, the routine goes from the step S8 to the step S15. In the same manner as the first embodiment, the braking pressure command value $P_{BD}$ is decreased by the predetermined value $\Delta P_{BD}$, the pressure decrease control is advanced, and the routine shown in FIG. 7 goes to the step S24 in which the initial state pass flag FB is reset to "0".

Then, after the actual inter-vehicle distance L is approximately equal to the target braking distance L* and the target braking pressure $P_B^*(n)$ indicates zero, the braking pressure command value $P_{BD}$ is below the target braking pressure $P_B^*(n)$ in the midway through the zeroed target braking pressure. In either of the cases, the target braking pressure $P_B^*(n)$ is set as the braking pressure command value $P_{BD}$.

(Third Embodiment)

Figure 9:
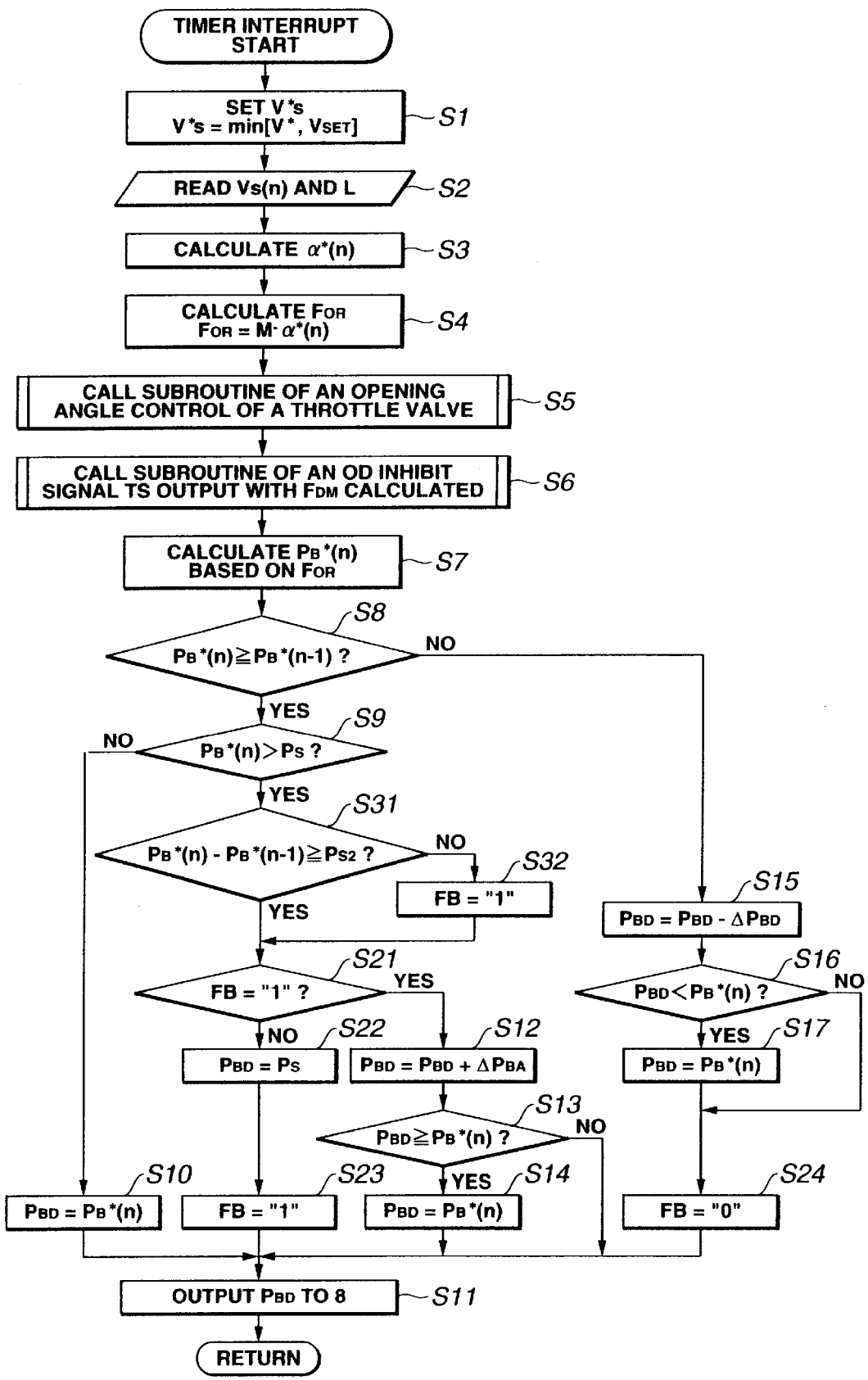
FIG. 9 is an operational flowchart representing a still another example of the vehicular velocity control procedure in a third preferred embodiment of the vehicular velocity controlling apparatus according to the present invention.

That is to say, in the third embodiment shown in FIG. 9, steps S31 and S32 are newly interposed between the steps S9 and S21 shown in FIG. 8 of the second embodiment.

In details, the step S31 indicates that a subtraction result of the subtraction of the previous target braking pressure $P_B^*(n-1)$ from the present target braking pressure $P_B^*(n)$ is equal to or larger than a second threshold value Ps2 set larger than the threshold value of the braking pressure Ps described above. If $\{P_B^*(n)-P_B^*(n-1)\} \geq Ps2$ (Yes) at the step S8, the vehicular velocity controlling section 50 determines that the present braking state is an abrupt pressure increase state that demands a higher initial response characteristic and the routine goes to the step S21. If $(P_B^*(n)-P_B^*(n-1))<Ps2$ (No) at the step S31, the routine goes to a step S32 since the vehicular velocity controlling section 50 determines that the present braking state is the abrupt pressure increase state that demands no higher response characteristic and the routine goes to the step S32. At the step S32, the initial stage pass flag FB is set to "1" and the routine goes to the step S21. The other steps than the steps S31 and S32 are the same as those described in FIG. 7. Hence, the detailed description thereof will herein be omitted.

In the case of the third embodiment, when the actual inter-vehicle distance L is abruptly shortened due to the interruption of the preceding vehicle from the other traffic lane to the same traffic lane as the vehicle, the present target braking pressure $P_B^*(n)$ calculated at the step S7 in the vehicular velocity control procedure shown in FIG. 9 is larger than the previous target braking pressure $P_B^*(n-1)$ by the braking pressure threshold value Ps but is smaller than the second braking pressure predetermined value Ps2, the routine of FIG. 9 is transferred from the step S31 to the step S32. Since the initial stage pass flag FB is set to "1", the routine goes via the step S21 to the step S12. At this time, in the same manner as the first embodiment described above, the braking pressure command value $P_{BD}$ provides the relatively moderate braking state such as to be increased by the predetermined value $\Delta P_{BA}$ for each timer interrupt period from the time at which the braking initial stage occurs so that the remarkably large braking force cannot be developed although the actual inter-vehicle distance L becomes narrow.

On the contrary, if the actual inter-vehicle distance L is abruptly reduced, the present target braking pressure $P_B^*(n)$ calculated at the step S7 in the vehicular velocity control procedure in FIG. 9 becomes larger than the previous target braking pressure $P_B^*(n-1)$ by the second predetermined value Ps2, the routine goes from the step S31 to the step S21. Since the initial state pass flag FB remains reset to "0", the routine goes to the step S22 in which the braking pressure command value $P_{BD}$ is increased by the predetermined value $\Delta P_{BA}$ for each timer interrupt period of time after the braking pressure command value $P_{BD}$ is abruptly increased up to the braking pressure command value Ps. The deceleration control that increases the response characteristic at the time of the narrowing of the actual inter-vehicle distance L can be moderated.

As described above, in the third embodiment, the braking characteristic can be modified in accordance with the magnitude of the target braking pressure $P_B^*(n)$ calculated during the initial stage of braking. Hence, the vehicular deceleration control can be carried out so as to match with the driver's sense of driving.

In each of the second and third embodiments, the braking pressure threshold value Ps is set as the braking pressure command value $P_{BD}$ at the step S22. The target braking pressure command value $P_B^*(n)$ calculated, for example, at the step S7 may be multiplied with such a constant as ½. ⅓, or so on.

In addition, in each of the first, second, and third embodiment described above, the target braking pressure of $P_B^*(n)$ is calculated by reference to the target braking pressure $P_B^*(n)$ may be calculated using an equivalent equation representing the characteristic line of FIG. 5.

Furthermore, in each of the first, second, and third embodiment, the braking pressure command value $P_{BD}$ is increased linearly by a constant gradient. At the initial stage of braking, the gradient is made larger at an earlier stage of braking, and, then, at a later stage of braking the gradient may be smaller. Furthermore, the braking pressure command value $P_{BD}$ may be increased in a quadratic curve.

In each of the first, second, and third embodiments, the vehicular velocity calculation processing on the follow-up run control is carried out by the follow-up run controller 20 in terms of the software. The vehicular velocity calculation processing may be constituted by the hardware of electronic circuitry such as a function generator, a comparator, a clock signal generator, up/down counter, an arithmetic/logic unit, and so forth.

The entire contents of a Japanese Patent Application No. Heisei 11-168265 (filed in Japan on Jun. 15, 1999) are herein incorporated by reference.

Although the invention has been described above by reference to certain embodiments of the invention, the invention is not limited to the embodiments described above. Modifications and variations of the embodiments described above will occur to those skilled in the art in the light of the above teachings. The scope of the invention is defined with reference to the following claims.

What is claimed is:

1. A vehicular velocity controlling apparatus for an automotive vehicle, comprising:
    an inter-vehicle distance detector to detect an inter-vehicle distance from the vehicle to a preceding vehicle which is running ahead of the vehicle;
    an inter-vehicle distance calculating section that calculates a target vehicular velocity to make a detected value of the inter-vehicle distance substantially equal to a target inter-vehicle distance;
    a vehicular velocity detector to detect a vehicular velocity of the vehicle; and
    a vehicular velocity controlling section that adjustably controls the vehicular velocity of the vehicle to make a detected value of the vehicular velocity substantially equal to the target vehicular velocity, the vehicular velocity controlling section including a target braking pressure calculating section that calculates a target braking pressure for a vehicular brake system in accordance with a target deceleration variable calculated on the basis of the target vehicular velocity and the detected value of the vehicular velocity; and a target braking pressure limiter to place a limitation on a rate of increase in the target braking pressure when the target braking pressure is in excess of a predetermined braking pressure threshold value.

2. A vehicular velocity controlling apparatus for an automotive vehicle as claimed in claim 1, wherein the target braking pressure limiter places the limitation on the rate of increase in the target braking pressure in such a manner that the rate of increase therein is increased in a substantially step change manner at an initial stage of the increase in the braking pressure and, thereafter, is increased relatively gradually up to the target braking pressure.

3. A vehicular velocity controlling apparatus for an automotive vehicle as claimed in claim 1, wherein the target braking pressure limiter places the limitation on the rate of increase in the target braking pressure in such a manner that the rate of increase in the braking pressure is increased gradually up to the target braking pressure at an initial stage of the increase in the target braking pressure.

4. A vehicular velocity controlling apparatus for an automotive vehicle as claimed in claim 1, wherein the target braking pressure limter places the limitation on the rate of increase in the braking pressure in such a manner that the rate of increase in the braking pressure is increased in a substantially step change manner at an initial stage of an increase in the braking pressure when a magnitude of the target braking pressure is equal to or larger than a predetermined magnitude of the braking pressure and in such a manner that the rate of increase in the target braking pressure is increased gradually up to the target braking pressure when the magnitude of the target braking pressure is smaller than the predetermined magnitude.

5. A vehicular velocity controlling apparatus for an automotive vehicle as claimed in claim 2, wherein the vehicular velocity controlling section includes a target vehicular driving force calculating section that calculates a target vehicular driving force to make the detected value of the vehicular velocity substantially equal to the target vehicular velocity and wherein the vehicular velocity controlling section controls a driving force exerted by a rotary driving force source, a gear position of a vehicular transmission, and the braking pressure exerted by the vehicular brake system on the basis of the target vehicular driving force and calculates the present target braking pressure $P_B^*(n)$ on the basis of the target driving force when the target driving force indicates a negative value exceeding the predetermined braking pressure threshold value Ps.

6. A vehicular velocity controlling apparatus for an automotive vehicle as claimed in claim 5, wherein the target braking pressure limiter includes: a first comparator to compare the present target braking pressure $P_B^*(n)$ with a one previous target braking pressure $P_B^*(n-1)$ to determine if $P_B^*(n) \geq P_B(n-1)$; a second comparator to compare the present target braking pressure $P_B^*(n)$ with the predetermined braking pressure threshold value Ps to determine if $P_B^*(n) > Ps$ when the first comparator determines that $P_B^*(n) \geq P_B^*(n-1)$; a braking pressure command value generator to generate a braking pressure command value $P_{BD}$ as follows: $P_{BD}=P_{BD}+\Delta P_{BA}$, wherein $\Delta P_{BA}$ denotes a predetermined value to determine a gradient of the rate of increase in the target braking pressure with respect to a predetermined period of time when the second comparator determines that $P_B^*(n) > Ps$; a third comparator to compare the braking pressure command value $P_{BD}$ with the present target braking pressure $P_B^*(n)$ to determine if $P_{BD} \geq P_B^*(n)$ when the second comparator determines that $P_{BD} > Ps$; and a brake pressure command value output device that outputs the braking pressure command value $P_{BD}$ to a vehicular brake controller as follows: $P_{BD}=P_B^*(n)$ when the third comparator determines that $P_{BD} \geq P_B^*(n)$ or when the second comparator determines that $P_B^*(n) \leq Ps$.

7. A vehicular velocity controlling apparatus as claimed in claim 6, wherein the braking pressure command value generator generates the braking pressure command value $P_{BD}$ as follows when the first comparator determines that $P_B^*(n) < P_B^*(n-1)$: $P_{BD}=P_{BD}-\Delta P_{BD}$, wherein $\Delta P_{BD}$ denotes another predetermined value to determine a gradient of a rate of decrease in the target braking pressure with respect to the predetermined period of time.

8. A vehicular velocity controlling apparatus for an automotive vehicle as claimed in claim 6, wherein the target braking pressure limiter further includes: an initial state determinator to determine whether a present vehicular running state falls in an initial state of the vehicular braking through the vehicular brake system in accordance with the target driving force when the second comparator determines that $P_B^*(n) > Ps$ and wherein the brake pressure command value output device outputs the brake pressure command value $P_{BD}$ to the brake controller as follows: $P_{BD}=Ps$ when the initial state determinator determines that the present vehicular running state falls in the initial state of braking.

9. A vehicular velocity controlling apparatus for an automotive vehicle as claimed in claim 6, wherein after the output of the pressure command value $P_{BD}=Ps$, the braking pressure command value output device outputs the brake pressure command value using the generated value at the braking pressure command generator as follows: $P_{BD}=P_{BD}+\Delta P_{BA}$.

10. A vehicular velocity controlling apparatus as claimed in claim 8, wherein the target braking pressure limiter further includes a fourth comparator to compare a deviation between the present target braking pressure $P_B^*(n)$ and the one previous target braking pressure $P_B^*(n-1)$ to determine if $P_B^*(n)-P_B^*(n-1) \geqq Ps2$, wherein Ps2 denotes a predetermined magnitude of the target braking pressure and Ps2>Ps when the second comparator determines that $P_B^*(n)>Ps$ and wherein the braking pressure command value output device outputs the braking pressure command value to the brake controller using the generated value of the braking pressure command value generator as follows: $P_{BD}=Ps$ when the initial state determinator determines that the present vehicular running state falls in the initial state of the vehicular braking.

11. A vehicular velocity controlling apparatus for an automotive vehicle, comprising:

inter-vehicle distance detecting means for detecting an inter-vehicle distance from the vehicle to a preceding vehicle which is running ahead of the vehicle;

inter-vehicle distance calculating means for calculating a target vehicular velocity to make a detected value of the inter-vehicle distance substantially equal to a target inter-vehicle distance;

vehicular velocity detecting means for detecting a vehicular velocity of the vehicle;

vehicular velocity controlling means for adjustably controlling the vehicular velocity of the vehicle to make a detected value of the vehicular velocity substantially equal to the target vehicular velocity, the vehicular velocity controlling means including: target braking pressure calculating means for calculating a target braking pressure for a vehicular brake system in accordance with a target deceleration variable calculated on the basis of the target vehicular velocity and the detected value of the vehicular velocity; and target braking pressure limiting means for placing a limitation on a rate of increase in the target braking pressure when the target braking pressure is in excess of a predetermined braking pressure threshold value.

12. A vehicular velocity controlling method for an automotive vehicle, comprising:

detecting an inter-vehicle distance from the vehicle to a preceding vehicle which is running ahead of the vehicle;

calculating a target vehicular velocity to make a detected value of the inter-vehicle distance substantially equal to a target inter-vehicle distance;

detecting a vehicular velocity of the vehicle;

adjustably controlling the vehicular velocity of the vehicle to make a detected value of the vehicular velocity substantially equal to the target vehicular velocity;

calculating a target braking pressure for a vehicular brake system in accordance with a target deceleration variable calculated on the basis of the target vehicular velocity and the detected value of the vehicular velocity; and placing a limitation on a rate of increase in the target braking pressure when the target braking pressure is in excess of a predetermined braking pressure threshold value.

\* \* \* \* \*